(12) United States Patent
Nohara et al.

(10) Patent No.: US 7,073,469 B2
(45) Date of Patent: Jul. 11, 2006

(54) INTAKE SYSTEM FOR AN INTERNAL COMBUSTION ENGINE

(75) Inventors: Tsuneyasu Nohara, Kanagawa (JP); Shinichi Takemura, Yokohama (JP); Takanobu Sugiyama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/316,059

(22) Filed: Dec. 11, 2002

(65) Prior Publication Data
US 2003/0127064 A1    Jul. 10, 2003

(30) Foreign Application Priority Data
Jan. 10, 2002 (JP) ............................ 2002-003061

(51) Int. Cl.
    *F01L 1/34* (2006.01)
(52) U.S. Cl. .................. 123/90.16; 123/389; 123/403; 123/401; 123/90.15
(58) Field of Classification Search ................ 123/389, 123/403, 378, 90.16, 401, 90.15
See application file for complete search history.

(56) References Cited

U.S. PATENT DOCUMENTS

| | | | | |
|---|---|---|---|---|
| 4,056,583 A | * | 11/1977 | Shinoda et al. ............ 261/36.2 |
| 4,094,286 A | * | 6/1978 | Kuroda et al. ........... 123/568.2 |
| 4,242,996 A | * | 1/1981 | Urbansky ............... 123/406.67 |
| 4,387,694 A | * | 6/1983 | Yoshiba et al. ............. 123/378 |
| 6,439,175 B1 | * | 8/2002 | Arai et al. ............... 123/90.11 |

FOREIGN PATENT DOCUMENTS

| | | |
|---|---|---|
| EP | 1 020 625 A2 | 7/2000 |
| EP | 1 039 116 A1 | 9/2000 |
| JP | 55-087834 A | 7/1980 |
| JP | 06-117280 A | 4/1994 |
| JP | 11-107725 A | 4/1999 |
| JP | 11-229928 A | 8/1999 |
| JP | 11-311135 A | 11/1999 |

* cited by examiner

*Primary Examiner*—Thomas Denion
*Assistant Examiner*—Zelalem Eshete
(74) *Attorney, Agent, or Firm*—Foley & Lardner LLP (57) ABSTRACT

An intake system for an internal combustion engine is provided which comprises a variable valve control apparatus capable of variably and continuously controlling the amount of intake air of an internal combustion engine by varying valve lift characteristics of an intake valve, a collector fluidly connected with a plurality of intake passages for cylinders of the internal combustion engine, and a pressure control mechanism for producing within the collector a vacuum that increases with increase of one of the amount of intake air, engine speed and engine load of the internal combustion engine.

16 Claims, 8 Drawing Sheets

| ENGINE OPERATING CONDITION | VALVE LIFT CHARACTERISTICS | |
|---|---|---|
| IDLING (INCLUDING MIDDLE TO HIGH SPEED AND EXTREMELY LOW LOAD OPERATION) | LIFT AND OPERATION ANGLE: EXTREMELY SMALL PHASE : MOST RETARDED |  |
| LOW LOAD (INCLUDING IDLING UNDER LOAD FOR DRIVING ACCESSORIES) | LIFT AND OPERATION ANGLE: EXTREMELY SMALL TO SMALL PHASE : ADVANCED |  |
| MIDDLE LOAD | LIFT AND OPERATION ANGLE: SMALL PHASE : MOST ADVANCED |  |
| HIGH LOAD LOW SPEED | LIFT AND OPERATION ANGLE: SMALL TO MIDDLE PHASE : MOST RETARDED/ADVANCED |  |
| HIGH LOAD MIDDLE SPEED | LIFT AND OPERATION ANGLE: MIDDLE PHASE : MOST RETARDED/ADVANCED |  |
| HIGH LOAD HIGH SPEED | LIFT AND OPERATION ANGLE: LARGE PHASE : MOST RETARDED/ADVANCED |  |

CONSTANT VACUUM PRESSURE CHART

FIG.10

CONSTANT VACUUM PRESSURE CHART

INTAKE SYSTEM FOR AN INTERNAL COMBUSTION ENGINE

BACKGROUND OF THE INVENTION

The present invention relates to an intake system for an internal combustion engine for controlling the amount of intake air by varying the valve lift characteristics of an intake valve.

In an internal combustion engine having a throttle valve in an intake passage for controlling the amount of fuel supplied to the engine in accordance with the amount of intake air by varying the opening degree of the throttle valve and thereby varying the amount of intake air, the intake vacuum downstream of the throttle valve becomes larger as the amount of intake air becomes smaller.

In the meantime, "larger vacuum" is herein intended to indicate a state that is higher in the degree of vacuum and closer to a complete vacuum, and "smaller vacuum" is intended to indicate a state that is lower in the degree of vacuum and closer to the atmospheric pressure.

On the other hand, in an in-cylinder injection type internal combustion engine in which fuel is injected directly into an combustion chamber to execute stratified combustion, the amount of injected fuel can be determined irrespective of the amount of intake air, thus making it possible to make smaller the intake vacuum irrespective of the operating condition of the internal combustion engine and thereby decrease the pumping loss.

Japanese Patent Provisional Publication No. 11-229928 discloses an example of setting or determination of the intake vacuum in the in-cylinder injection type internal combustion engine, i.e., to set the intake vacuum at a constant value a little smaller than the atmospheric pressure or to allow the intake vacuum to have such a variable characteristic of decreasing slightly with increase of the torque (refer to FIG. 11 of the above-described publication).

SUMMARY OF THE INVENTION

It is a general practice to treat blow-by gas produced within a crankcase of an internal combustion engine by using a vacuum within an intake system. The amount of blow-by gas increases with increase of the amount of intake air, engine speed or engine load. Accordingly, setting the intake vacuum at a constant value has a possibility of causing insufficient treatment of blow-by gas under an engine operating condition in which a larger amount of blow-by gas is produced and a possibility of causing an excessively large vacuum pressure and therefore an insufficient decrease of pumping loss under an engine operation condition in which a smaller amount of blow-by gas is produced.

It is accordingly an object of the present invention to provide an intake system for an internal combustion engine that can solve the above-noted problems.

To accomplish the above object, there is provided according to an aspect of the present invention an intake system for an internal combustion engine comprising a variable valve control apparatus capable of variably and continuously controlling the amount of intake air of an internal combustion engine by varying valve lift characteristics of an intake valve, a collector fluidly connected with a plurality of intake passages for cylinders of the internal combustion engine, and a pressure control mechanism for producing within the collector a vacuum that increases with increase of one of the amount of intake air, engine speed and engine load of the internal combustion engine.

According to another aspect of the present invention, there is provided an internal combustion engine comprising a variable valve control apparatus for variably controlling a valve lift, operation angle and maximum lift phase of an intake valve thereby variably controlling the amount of intake air supplied to cylinders in accordance with an engine operating condition, a collector in the form of a box, a plurality of intake passages fluidly connecting between the collector and the respective cylinders, and a pressure control mechanism for producing within the collector a vacuum that varies depending upon a variation of the engine operating condition.

DESCRIPTION OF THE PREFERRED EMBODIMENT

The present invention will be described hereinafter with respect to embodiments that are applied to an automotive spark ignition internal combustion engine.

Figure 1:
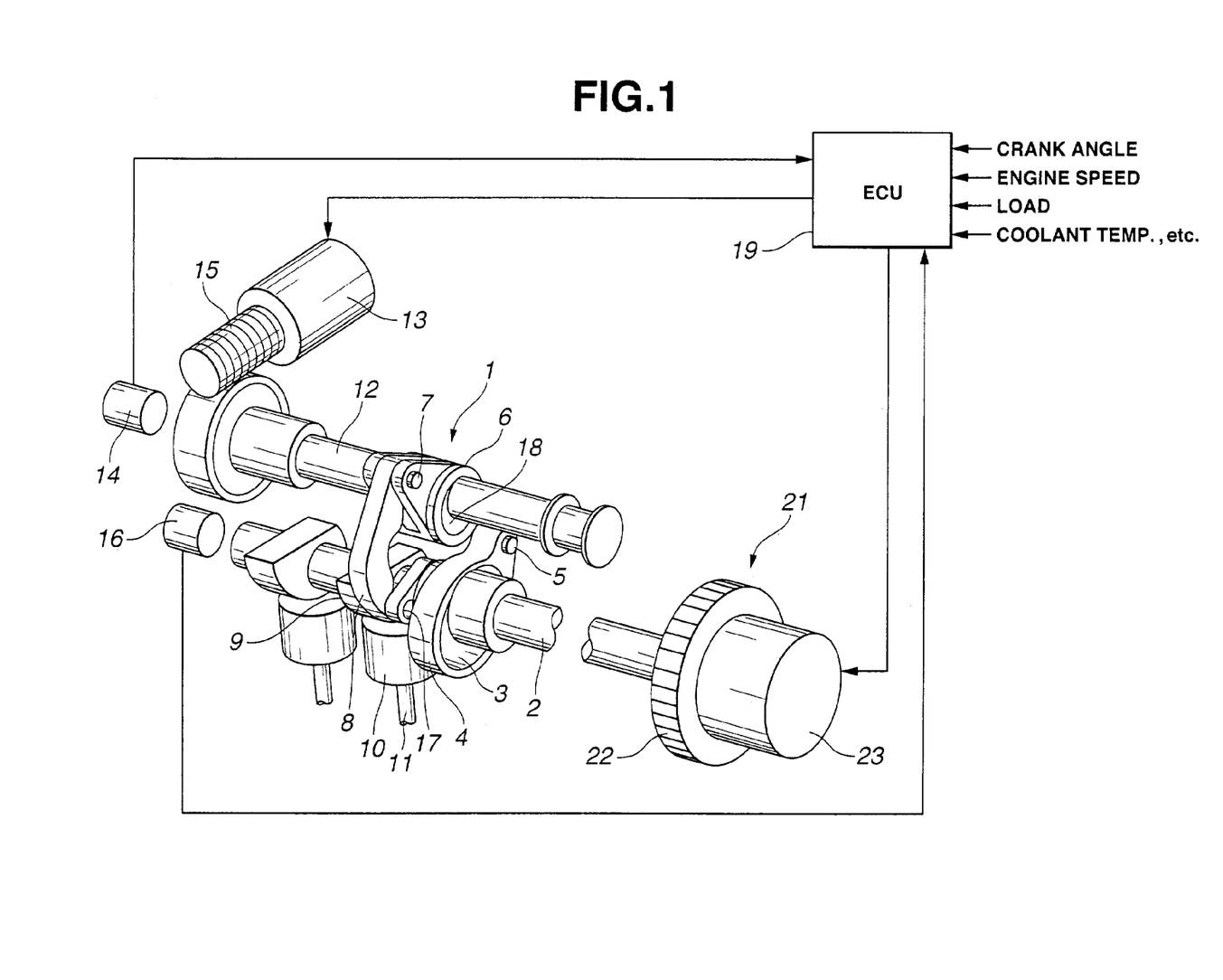
FIG. 1 is a perspective view of a variable valve timing control apparatus used in an intake system of an internal combustion engine according to an embodiment of the present invention.

FIG. 1 shows a variable valve timing control apparatus utilized in an intake system of an internal combustion engine according to an embodiment of the present invention. The variable valve timing control apparatus includes a lift and operation angle control mechanism 1 capable of varying a lift and operation angle of intake valve 11 and a phase control mechanism 21 capable of varying a maximum lift phase of intake valve 11, i.e., a maximum lift phase of intake valve 11 relative to a rotational phase of crankshaft (not shown).

Description will be first made as to lift and operation angle control mechanism 1. In the meantime, lift and operation angle control mechanism 1 is substantially the same as that the applicant proposed before, for example, disclosed in Japanese Patent provisional Publication No. 11-107725 and therefore only brief description thereof will be made hereinafter.

Lift and operation angle control mechanism 1 includes intake valves 11 reciprocally installed on a cylinder head (not shown), drive shaft 2 rotatably supported on the upper part of the cylinder head by cam brackets (not shown), eccentric cam 3 force-fitted or otherwise fixedly attached to drive shaft 2, control shaft 12 disposed above and in parallel with drive shaft 2 and rotatably supported on the cylinder head by the above described cam brackets, rocker arm 6 mounted on eccentric cam portion 18 of control shaft 12 for oscillation motion, and oscillation cam 9 engaging tappet 10 provided to an upper end portion of each intake valve 11. Eccentric cam 3 and rocker arm 6 are operatively connected by pivotal link 4, and rocker arm 6 and oscillation cam 9 are operatively connected by connecting rod 8.

Drive shaft 2 is driven by the crankshaft of the engine by way of a timing chain or timing belt (not shown) as will be described hereinafter.

Eccentric cam 3 has a circular external surface the center of which is offset from a rotational axis of drive shaft 2 by a predetermined amount. On the circular external surface is rotatably fitted or mounted an annular base portion of pivotal link 4.

Rocker arm 6 is mounted at a central portion thereof on eccentric cam portion 18 and has an end portion to which the protruded arm portion of above described pivotal link 4 is pivotally connected by means of connecting pin 5 and another end portion to which an upper end portion of connecting rod 8 is pivotally connected by means of connecting pin 7. Eccentric cam portion 18 has a geometric center that is offset from the rotational axis of control shaft 12 so that an axis of oscillation of rocker arm 6 varies depending upon a variation of a rotational position or phase of control shaft 12.

Oscillation cam 9 is rotatably mounted on drive shaft 2 and has a laterally protruded end portion to which a lower end portion of connecting link 8 is pivotally connected. Oscillation cam 9 has at its lower side thereof a basic circular or dwell surface and a cam or lift surface extending from the basic circular surface so as to have a predetermined curved profile. The basic circular surface and cam surface are brought into engagement with the upper surface of tappet 10 in response to oscillation of oscillation cam 9.

Namely, the above-described basic circular surface serves as a base circle area that regulates the amount of lift to zero. When oscillation cam 9 is turned or rotated to bring the cam surface serving as a lift or rise area into contact with tappet 10, there is caused a lift of intake valve 11 that increases gradually with further rotation of oscillation cam 9. In the meantime, between the basic circular area and the lift area is provided a small ramp area.

Control shaft 12 is constructed so as to be rotatable within a predetermined rotational angle range by being driven by hydraulic, lift and operation angle control actuator 13 installed on an end of control shaft 12 as shown in FIG. 1. Lift and operation angle control actuator 13 is, for example, made up of a servomotor that drives control shaft 12 by way of worm gear 15 and is controlled in response to a control signal from engine control unit (ECU) 19. In this connection, the rotational angle of control shaft 12 is detected by control shaft sensor 14 made up of an analogous sensor, and based on the detected, actual control condition is closed-loop controlled actuator 13.

The operation of lift and operation angle control mechanism 1 will now be described. Rotation of drive shaft 2 causes pivotal link 4 to move up and down by the operation of eccentric cam 3. By this, rocker arm 6 is caused to oscillate. This oscillation motion of rocker arm 6 causes oscillation cam 9 to oscillate. By oscillation motion of oscillation cam 9, tappet 10 is caused to move up and down, causing intake valve 11 to open and close.

In this connection, when the rotational position or phase of control shaft 12 is varied by actuator 13, the initial position of rocker arm 6 is caused to vary, and therefore the initial position of oscillation cam 9 is caused to vary.

For example, when eccentric cam portion 18 is generally positioned in a higher place in FIG. 1, i.e., when the geometric center of eccentric cam portion 18 is located above the rotational axis of control shaft 12, rocker arm 6 is bodily moved into a higher place, thus causing the connecting pin 17 side end portion of oscillation cam 9 to be moved into a higher position. Namely, when oscillation cam 9 is rotated into the initial position, the cam surface is caused to incline away from tappet 10. Accordingly, when oscillation cam 9 is caused to oscillate in response to rotation of drive shaft 2, the basic circular surface is brought into contact with tappet 10 for a longer period, whereas the cam surface is brought into contact with tappet 10 for a shorter period. Accordingly, the amount of lift is small, and an angular range from an opening timing to a closing timing, i.e., the operation angle is reduced.

On the contrary, eccentric cam portion 18 is generally positioned in a lower place in FIG. 1, rocker arm 6 is bodily moved into a lower place, thus causing the connecting pin 17 side end portion of oscillation cam 9 to move into a lower position. Namely, when oscillation cam 9 is rotated into the initial position, the cam surface is caused to incline toward tappet 10. Accordingly, when oscillation cam 9 oscillates in response to rotation of drive shaft 2, the place where oscillation cam 9 is brought into contact with tappet 10 changes immediately from the basic circular surface to the cam surface. Accordingly, the amount of lift becomes larger and the operation angle is enlarged.

Since the initial position of eccentric cam portion 18 can be varied continuously, the lift and operation angle characteristics of intake valve 11 can be varied continuously. Namely, both of the lift and operation angle can be increased and decreased simultaneously and continuously. Particularly, by lift and operation angle control mechanism 1, the opening and closing timings of intake valve 11 are varied so as to be nearly symmetrical with respect to the maximum lift phase, in response to a variation of the lift and operation angle.

Then, phase control mechanism 21 includes sprocket 22 installed on an end portion of drive shaft 2, and hydraulic, phase control actuator 23 for rotating sprocket 22 relative to drive shaft 2 within a predetermined angular range. Sprocket 22 is drivingly connected to the crankshaft (not shown) by way of the timing chain or timing belt (not shown) so as to be rotatable in timed relation to the crankshaft. Phase control actuator 23 is, for example, made up of a hydraulic or electromagnetic rotary actuator and is controlled in response to a control signal from ECU 19. By the operation of actuator 23, sprocket 22 and drive shaft 2 are rotated relative to each other to advance or retard the valve timing or phase. Namely, the curve representative of the valve lift characteristics itself does not change but is advanced or retarded in its entirety. Further, such a variation can be attained continuously. The actual controlled condition of phase control mechanism 21 is detected by drive shaft sensor 16, and based on the detected condition actuator 23 is closed-loop controlled.

In the internal combustion engine having on the intake valve side the above-described variable valve timing control apparatus according to an embodiment of the present invention, the amount of intake air is controlled by a variable control of intake valve 11 without depending upon the throttle valve. However, in an engine for actual use, a pressure control mechanism for production of a vacuum pressure is disposed on the upstream side of the intake passage in place of the throttle valve since, as will be described later, it is desired for circulation of blow-by gas or the like that a little vacuum pressure is present in the intake system.

Figure 2:
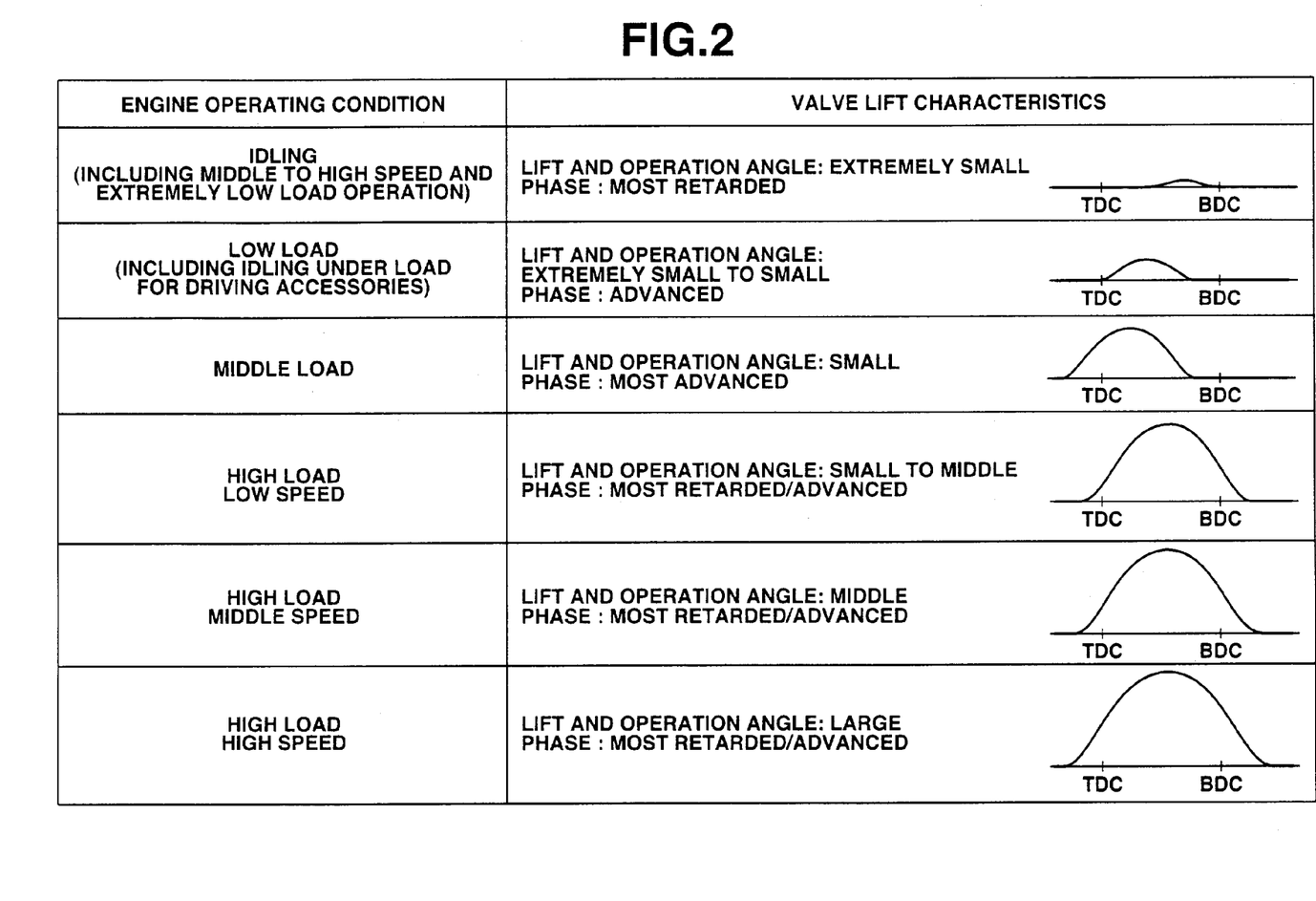
FIG. 2 is a view for illustrating the valve lift characteristics of the variable valve timing control apparatus of FIG. 1 under typical engine operating conditions.

A control of the amount of intake air using above-described lift and operation angle control mechanism 1 and the above-described phase control mechanism 21 will be described. FIG. 2 shows the valve lift characteristics of an intake valve under typical engine operating conditions. As seen from FIG. 2, the valve lift becomes extremely small under an extremely low load engine operating condition, e.g., at idling. Namely, the valve lift becomes smaller to such an extent that the maximum lift phase does not cause any influence on the amount of intake air. The maximum lift phase controlled by phase control mechanism 21 is most advanced thereby causing the closing timing to be set at a point immediately before BDC.

By making the valve lift extremely small, the intake flow is diminished by the restricted passage or space provided by intake valve 11, thus making it possible to obtain an extremely small flow rate necessitated for the extremely low load engine operating condition stably. Since the closing time is adjacent BDC, the effective compression ratio becomes sufficiently high and in addition an improved gas flow is attained by the effect of an extremely small lift, thus making it possible to obtain relatively good combustion.

On the other hand, under a low load engine operating condition that is larger in engine load than the extremely low load engine operating condition, the lift and operation angle becomes large and the maximum lift phase is advanced. The low load engine operating condition includes idling under the load of an engine accessory or engine accessories. At this time, the amount of intake air is controlled also on consideration of the valve timing so as to become small by advancing the intake valve closing timing. As a result, the lift and operation angle becomes large to a certain extent, thus reducing the pumping loss caused by intake valve 11.

In the meantime, the extremely small lift under the extremely low load engine operating condition, e.g., at idling scarcely causes the amount of intake air to vary even if the phase is changed. Thus, at the time of transition from the extremely low load engine operating condition to the low load engine operating condition, it is necessitated to make the lift and operation angle larger prior to changing the phase. Such a control is also necessitated in case a load of an accessory such as a compressor for air conditioning is additionally applied to the engine.

On the other hand, when the load increases further so as to put the engine into the middle load engine operating condition in which combustion becomes stable, the lift and operation angle are increased further and the maximum lift phase is advanced as shown in FIG. 2. The maximum lift phase is most advanced at a certain engine load under the middle load engine operating condition. This makes it possible to utilize the internal EGR to decrease the pumping loss further.

Further, at maximum load, the lift and operation angle is enlarged further and phase control mechanism 21 is controlled so that an optimal valve timing is obtained. In the meantime, as shown in FIG. 2, the optimal valve lift characteristics vary depending upon a variation of the engine speed.

Then, a concrete structure of an intake system is described with reference to FIGS. 3 and 4.

Figure 3:
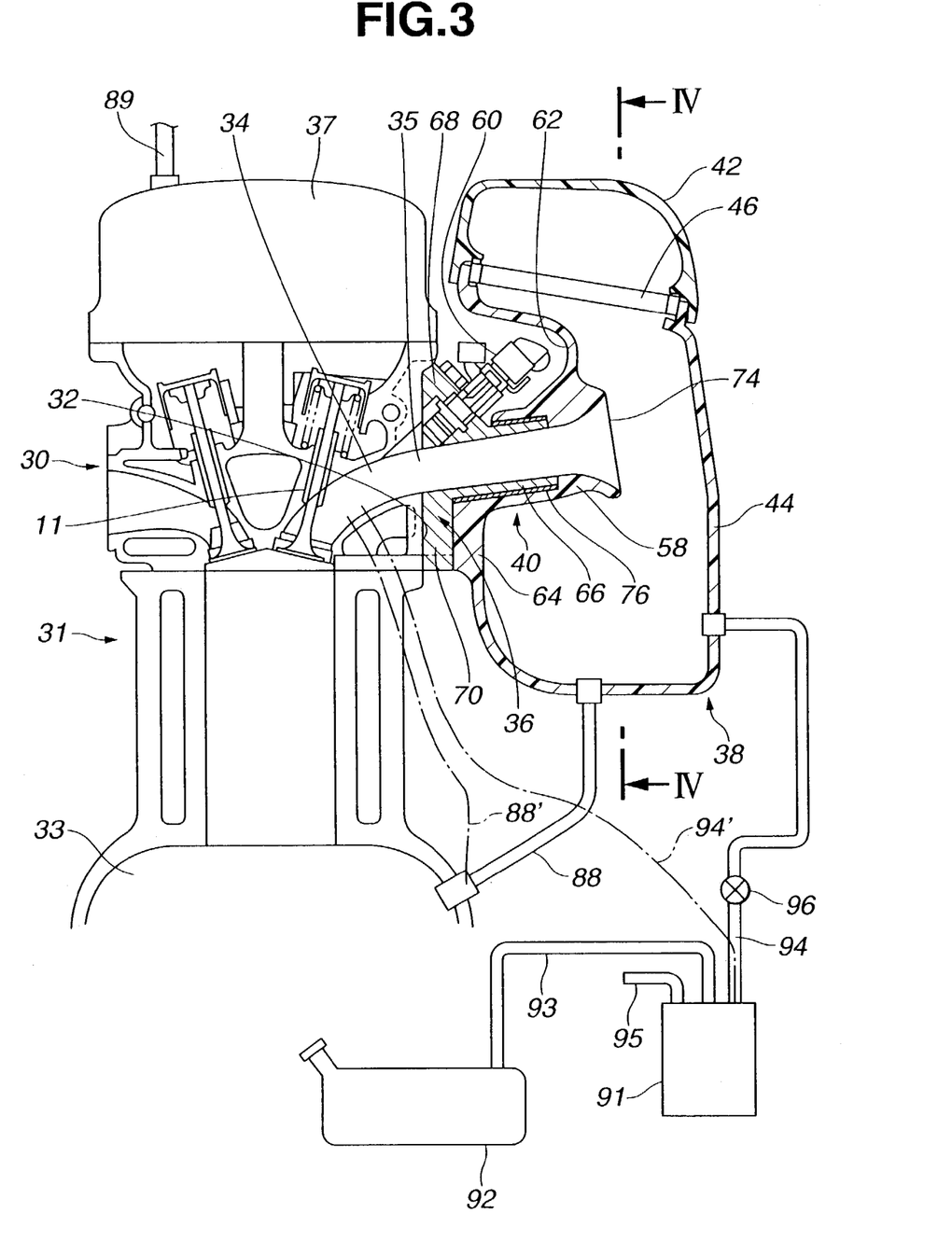
FIG. 3 is a sectional view of an important portion of the internal combustion engine for showing the intake system including a collector.

As shown in FIG. 3, side surface 32 of cylinder head 30 has intake ports 35 of intake passages 34 for a plurality of (four in this embodiment) cylinders (no numeral). Bracket 36 is fixedly attached to side surface 32 in a way as to cover intake ports 35 of intake passages 34. To bracket 36 is directly attached collector 38 that is box-shaped and elongated in the direction along which the cylinders are arranged in an array. Collector 38 has a plurality of hollow intake branches 40 that protrude into the inside thereof and are communicated with respective intake passages 34.

Collector 38 is made up of two members, i.e., collector cover 42 and collector body 44 that are made of a light resinous material, and between the both members is disposed air cleaner element 46. In the meantime, collector cover 42 and collector body 44 are detachably fastened together by clips (not shown), with air cleaner element 46 being placed therebetween.

Figure 4:
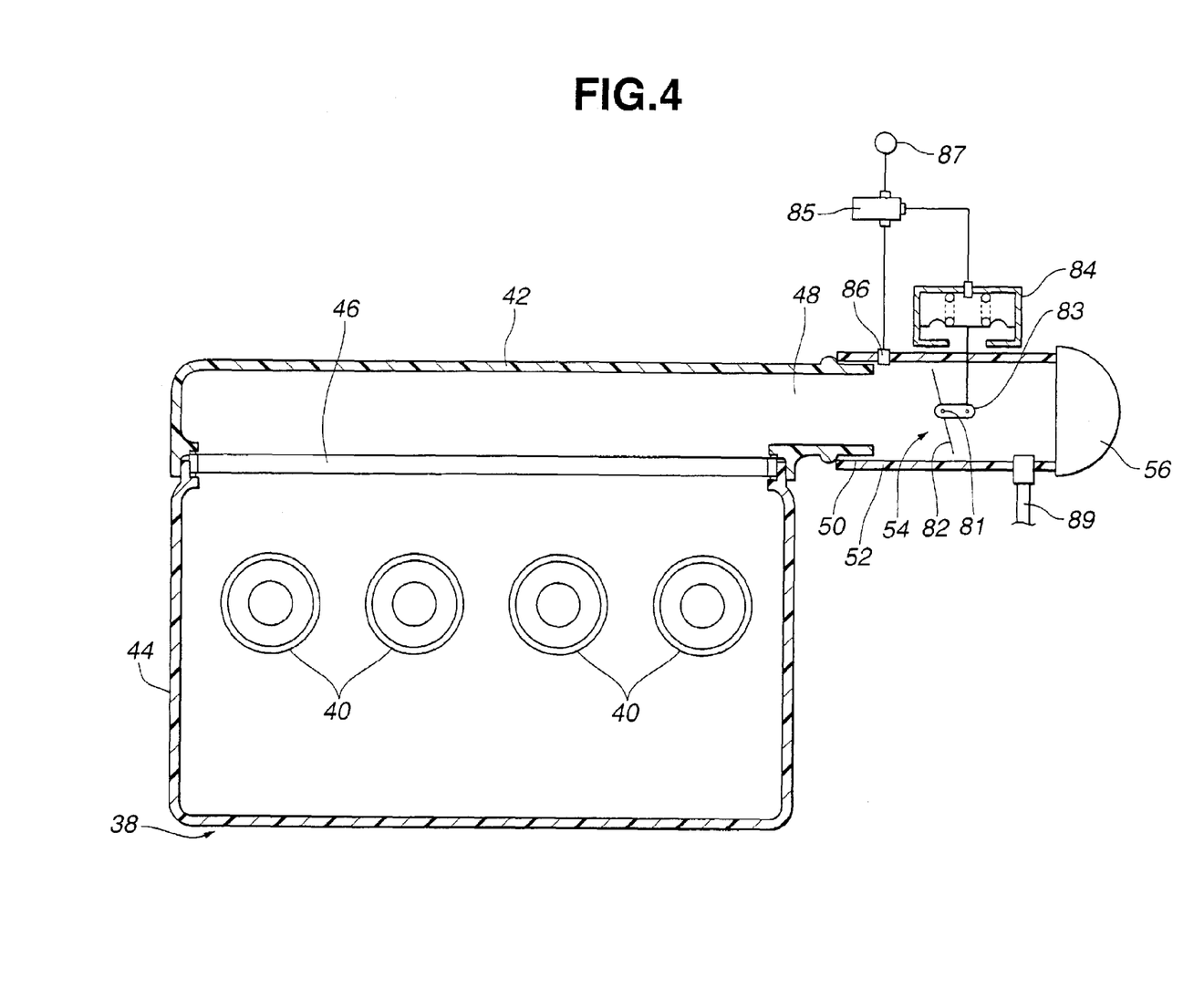
FIG. 4 is a sectional view taken along the line IV-IV of FIG. 3.

As shown in FIG. 4, collector cover 42 has at a longitudinal end thereof integral, hollow, cylindrical intake air inlet portion 48 to which intake air inlet pipe 52 is attached by interposing therebetween gasket 50. In intake air inlet pipe 52 is disposed pressure control valve 54 that constitutes a pressure control mechanism.

In the meantime, at the inlet portion of intake air inlet pipe 52 is disposed inlet filter 56 that is more widely meshed as compared with air cleaner element 46 for preventing ingress of relatively large foreign matters into pressure control valve 54.

As shown in FIG. 3, collector body 44 includes first branch constituting portions 58 protruding inward of collector 38 to constitute part of intake branches 40, recessed portion 62 for preventing interference with fuel injectors 60 for injecting fuel into intake passages 34, and plate portion 64 fixedly attached to mounting bracket 36 while being held in surface-to-surface contact with the same. Such portions 58, 62, 64 are formed integral with each other. Mounting plate portion 64 is formed thicker as compared with the other portions so as to attain a high mounting rigidity.

Mounting bracket 36 is made of aluminium alloy or the like having a high rigidity similarly to cylinder head 30, and includes hollow, cylindrical, second branch constituting portions 66 that constitute parts of respective intake branches 40, mounting boss portions 68 for mounting of fuel injectors 60, and mounting plate portions 70 interposed between side surface 32 of cylinder head 30 and mounting plate portions 64 of collector body 44. Such portions 66, 68, 70 are formed integral with each other. Above-described bracket 36 is fastened to side surface 32 of cylinder head 30 by means of a plurality of bolts (not shown).

Each intake branch 40 is so termed as to indicate a hollow cylindrical body that forms an additional intake passage extending from intake ports 35 of intake passages 34 to bell mouth-shaped open end portion 74 opening to the inside of collector 38. In this embodiment, each intake branch 40 is made up of first branch constituting portion 58 fitted on mounting bracket 36 by way of gasket 76 and second branch constituting portion 66.

In this manner, by attaching collector 38 directly to side surface 32 of cylinder head 30, collector 38 can attain high support rigidity and the intake system can be compact. Further, as shown in FIG. 3, collector 38 has a cross section that is elongated in the top-to-bottom direction of the engine (i.e., axially of the cylinder), thus making it possible to decrease the amount of protrusion of collector 38 in the engine width direction and effectively use a dead space at the side of cylinder head 30.

As shown in FIG. 4, above-described pressure control valve 54 includes butterfly type valve body 82 attached to rotatable shaft 81 so as to open and close intake air inlet pipe 52, diaphragm type vacuum actuator 84 connected to valve body 82 by way of link 83, and three-way solenoid operated valve 85 for controlling vacuum supplied to vacuum actuator 84. Above-described in take air inlet pipe 52 is provided with vacuum detection port 86 at the downstream side of valve body 82, and three-way solenoid operated valve 85 supplies the vacuum from vacuum detection port 86 or the vacuum from vacuum tank 87 to vacuum actuator 84 selectively. Above-described vacuum tank 87 is, for example, a tank that stores vacuum produced by a vacuum pump (not shown) and used for a master bag of a braking mechanism. Thus, particularly within vacuum tank 87 is stored vacuum that is larger than that to be produced in collector 38.

Further, the above-described intake system constitutes part of a blow-by gas treatment device, so that as shown in FIG. 3, blow-by gas treatment passage 88 that is communicated at an end with crank case 33 within cylinder block 31 is connected at the other end to the lower portion of collector 38. Fresh air induction passage 89 is communicated at one end with the space above cylinder head 30 and covered by cylinder head cover 37 and is connected at the other end, as shown in FIG. 4, with intake air inlet pipe 52 at the upstream side of pressure control valve 54. In the meantime, the space above cylinder head 30 and crankcase 33 are communicated with each other by way of a passage (not shown) formed inside cylinder block 31. The blow-by gas treatment device is similar in the basic operation to that usually used in a gasoline engine having a throttle valve. Namely, the blow-by gas that has leaked through a piston ring into the crankcase 33 side is caused by the vacuum produced in collector 38 to flow into collector 38 through blow-by gas treatment passage 88 while at the same time causing fresh air to be introduced through fresh air induction passage 89 into the space above cylinder head 30. Further, as will be described hereinafter, at full load at which pressure control valve 54 is fully open, part of blow-by gas is caused to flow in the reverse direction through fresh air induction passage 89 into intake air inlet pipe 52 and sucked through collector 38 into combustion chambers.

Further, the above-described intake system constitutes part of an evaporated fuel treatment device.

The evaporated fuel treatment device, as shown in FIG. 3, has, as a major component, canister 91 that absorbs evaporated fuel. Canister 91 and fuel tank 92 are communicated with each other by way of evaporated fuel induction passage 93. Evaporated fuel treatment passage or purge passage 94 is connected at one end with a purge port of canister 91 and at the other end with collector 38 so that purge gas is drawn into collector 38 together with fresh air introduced through open air inlet passage 95 into canister 91. In above-described purge passage 94 is disposed purge control valve 96 made up of an ON-OFF type solenoid operated valve or flow control valve for controlling induction of purge gas in accordance with the operating condition of the internal combustion engine.

Then, referring to FIGS. 5 to 10, an operation of pressure control valve 54 will be described.

Figure 5A:
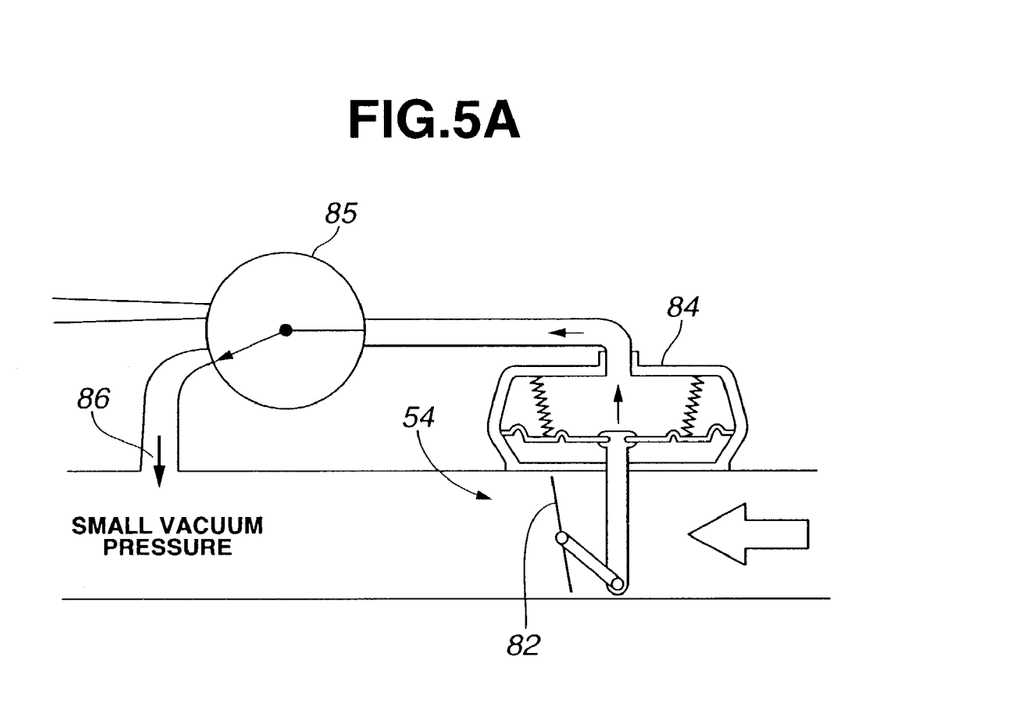
FIGS. 5A and 5B are schematic views for illustrating operations of a pressure control valve employed in the intake system under a normal engine operating condition.
Figure 5B:
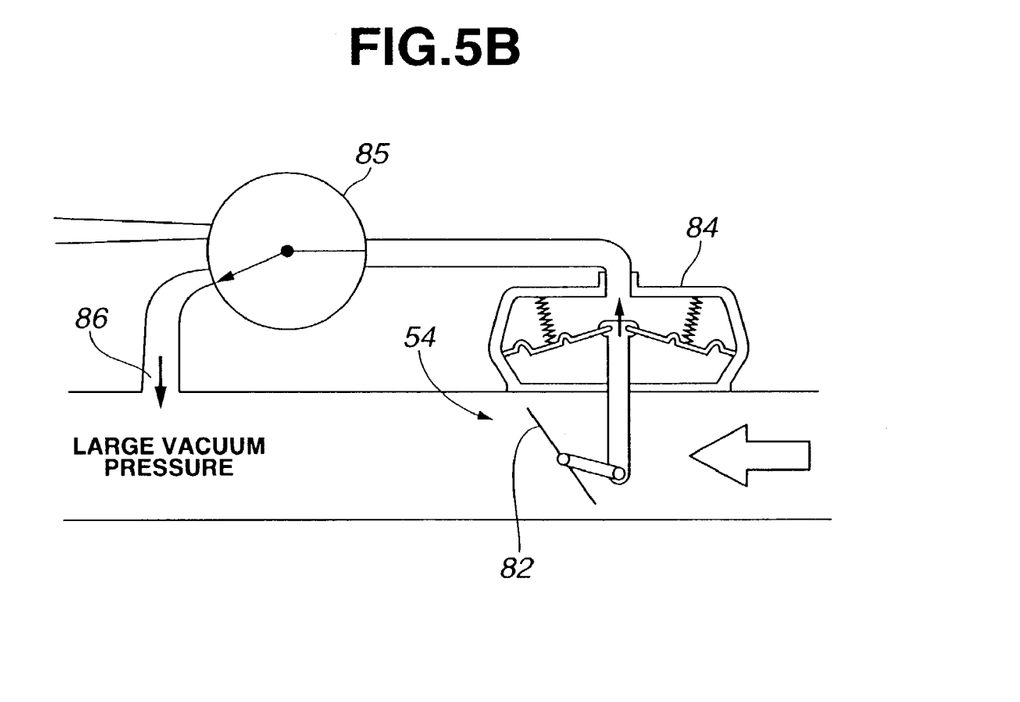
Figure 7:
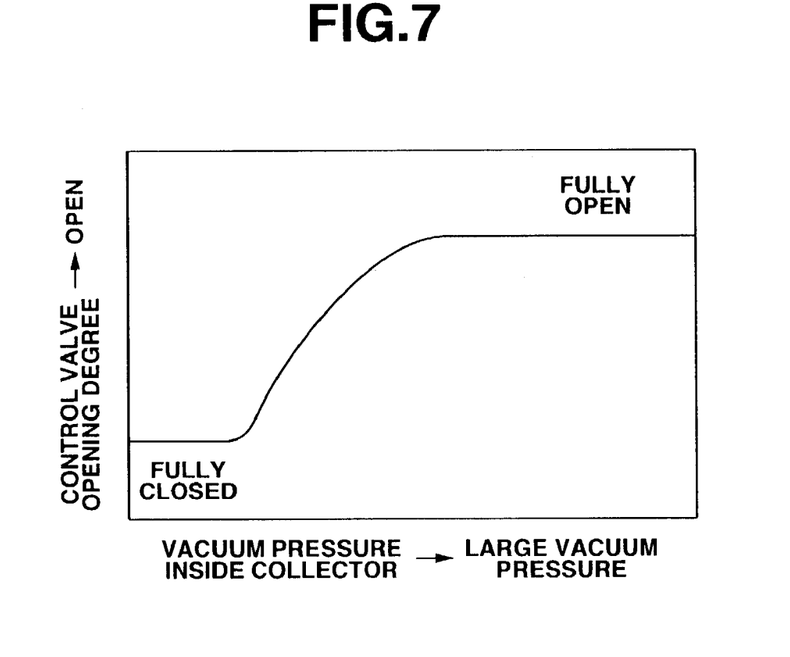
FIG. 7 is a graph showing a relation between the vacuum pressure within the collector and the opening degree of the pressure control valve.

At normal engine operating condition, three-way solenoid operated valve 85 is held switched so as to communicate vacuum actuator 84 with vacuum detection port 86. Accordingly, as shown in FIGS. 5A and 5B, the vacuum produced at collector 38 is introduced into the vacuum chamber of vacuum actuator 84 thereby causing valve body 82 to variably control the opening of intake air inlet pipe 52. Specifically, when the vacuum introduced into vacuum actuator 84 becomes smaller, the opening degree of valve body 82 is reduced (refer to FIG. 5A). On the contrary, when the vacuum introduced into vacuum actuator 84 becomes larger, the opening degree of valve body 82 is increased (refer to FIG. 5B). Thus, pressure control valve 54 cooperates with vacuum actuator 84 and three-way solenoid operated valve 85 to constitute a mechanical feedback mechanism for automatically controlling the opening degree of valve body 82 so that the vacuum pressure inside collector 38 is stably maintained at a predetermined value. FIG. 7 shows a relation between the vacuum pressure within collector 38 and the opening degree of valve body 82. As seen from FIG. 7, valve body 82 is held in a fully closed position until the vacuum exceeds a value corresponding to a set load of vacuum actuator 84 and moved into a fully open position when the vacuum pressure becomes equal to or larger than a certain value. Valve body 82 is moved between the fully open position and the fully closed position depending upon a variation of the vacuum pressure within certain limits.

Figure 8:
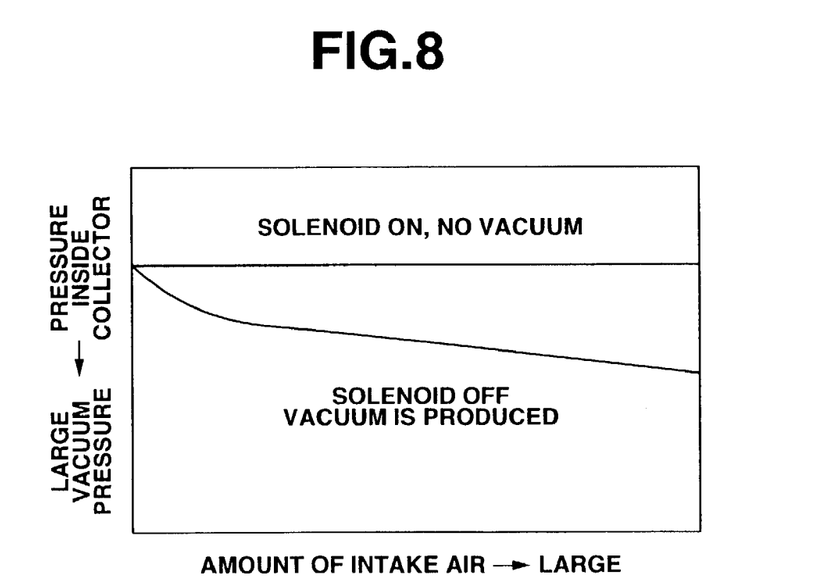
FIG. 8 is a graph showing a relation between the amount of intake air and the vacuum pressure within the collector.

As shown in FIG. 8, as the amount of intake air of the internal combustion engine increases, the resulting vacuum pressure tends to increase. More specifically, when the amount of intake air is in an extremely small range, valve body 82 is fully closed, thus causing the vacuum pressure to increase sharply. Thereafter, the vacuum pressure increases gradually with increase of the amount of intake air. In the meantime, the axis of ordinates in FIG. 8 indicates the pressure inside collector 38 and the lower side indicates the larger vacuum pressure.

Figure 9:
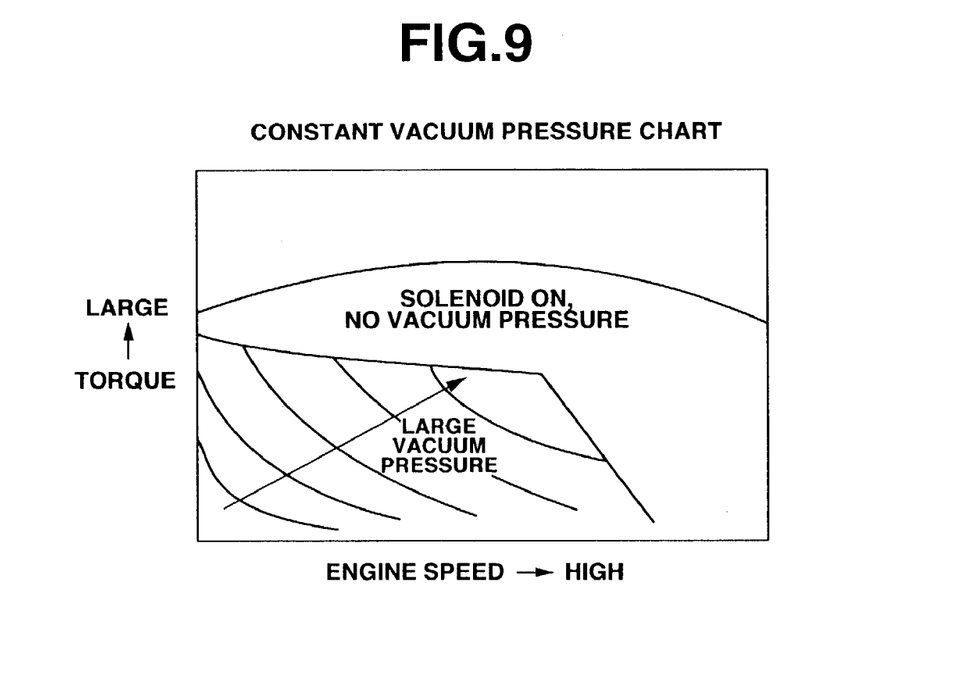
FIG. 9 is a graph showing a constant vacuum pressure chart with respect to the amount of intake air and the vacuum pressure within the collector.

Further, the amount of intake air has a relation with the engine speed and engine load. As shown in FIG. 9, in relation to the engine speed and engine load, the vacuum pressure becomes smaller with decrease of the engine speed and engine load and becomes larger with increase of the engine speed and engine load. Accordingly, the vacuum pressure is smallest at idling.

Such vacuum characteristic is desirable for reduction of the pumping loss and the treatment of evaporated fuel and blow-by gas.

Firstly, treatment of evaporated fuel is not executed at idling. This is because at idling the air flow rate is small so that a large variation of the air-fuel ratio within the cylinder is caused if the intake air is added with a mixture having a high concentration of fuel such as purge gas. Accordingly, a small vacuum pressure at idling does not cause any problem on the treatment of evaporated gas and can attain a sufficient reduction of pumping loss at idling. Under the engine operating condition in which the amount of intake air is large, the purge gas or evaporated fuel can be added to the intake air actively and at this time the amount of intake air itself is large so that an influence that addition of purge gas to the intake air exerts on the air-fuel ratio becomes relatively smaller. Namely, the above-described vacuum characteristic can reduce the pumping loss while making it easy to treat the evaporated gas.

Then, consideration being given to the treatment of blow-by gas, the amount of gas leaking through the piston ring to the crank case 33 side, i.e., the amount of produced blow-by gas has a tendency to increase with increase of the engine speed. Namely, the amount of produced blow-by gas increases with increase of the amount of intake air. Accordingly, since the intake system of this invention has such characteristics that the vacuum pressure increases with increase of the amount of intake air, engine speed and engine load, it becomes possible to treat the blow-by gas adequately and assuredly and suppress deterioration of oil, etc. otherwise caused by blow-by gas.

Figure 10:
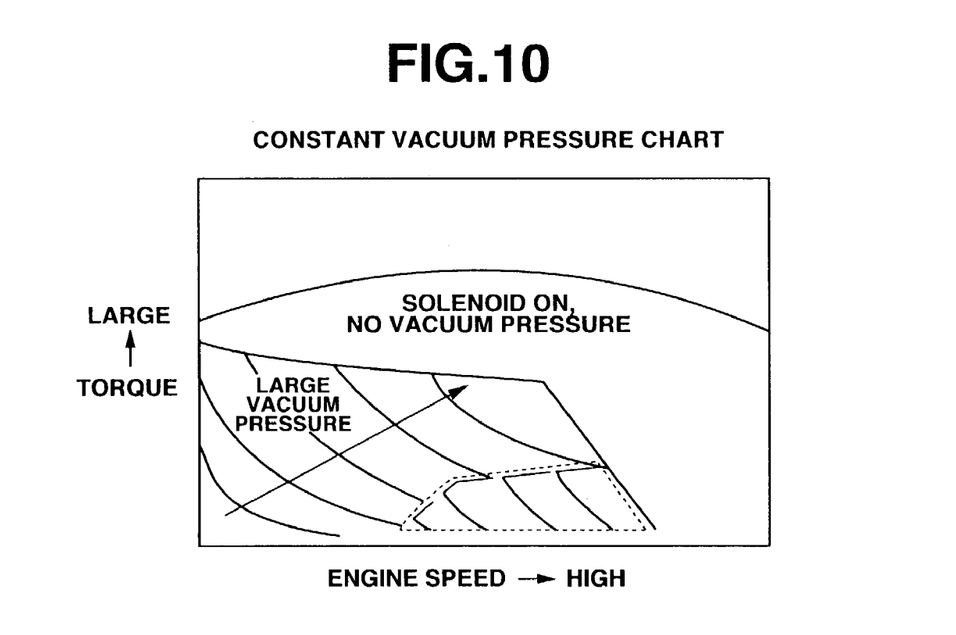
FIG. 10 is a view similar to FIG. 9 but shows another embodiment of the present invention.

In the meantime, since the amount of produced blow-by gas increases sharply when the engine speed increases from a certain value under a low load engine operating condition, it will do to change the set vacuum pressure stepwise as shown in the constant vacuum pressure chart of FIG. 10. In FIG. 10, the vacuum pressure is set smaller in the area surrounded by the dotted line.

Figure 6:
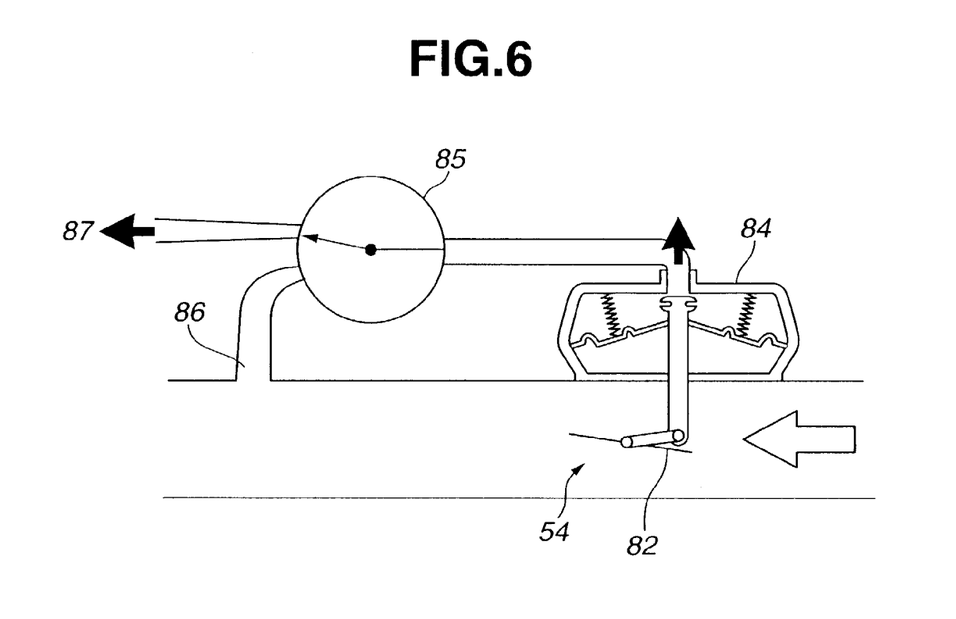
FIG. 6 is a schematic view for illustrating an operation of the pressure control valve under a full load engine operating condition.

On the other hand, under a predetermined high load engine operating condition including a full load condition, three-way solenoid operated valve 85 is switched so as to communicate vacuum actuator 84 with the vacuum tank 87 side as shown in FIG. 6. This introduces a large vacuum pressure introduced into vacuum actuator 84, thus causing valve body 82 to be moved into a fully open position immediately. Thus, valve body 82 does not cause any substantial passage resistance and a good fully open performance efficiency can be attained. In other words, the pressure inside collector 38 is maintained at an atmospheric pressure, thus reducing the pumping loss.

From the foregoing, it will be understood that the intake system for an internal combustion engine of the present invention controls the amount of intake air without depending upon the throttle valve, thus making it possible to reduce the pumping loss. In addition, the intake system can produce a suitable vacuum within the collector. This makes it possible, for example, to treat the blow-by gas and the evaporated fuel assuredly and suppress increase of the pumping loss otherwise caused due to production of an excessively large vacuum.

The entire contents of Japanese Patent Publication P2000-3061 (filed Jan. 10, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, the blow-by gas treatment passage may be modified as shown by one-dot chain line 88' in FIG. 3 so as to have an outlet communicated with intake passages 34. Further, the evaporated fuel treatment passage may be modified as shown by one-dot chain line 94' in FIG. 3 so as to have an outlet communicated with intake passages 34. The scope of the invention is defined with reference to the following claims.

What is claimed is:

1. An intake system for an internal combustion engine comprising:
   a variable valve control apparatus capable of variably and continuously controlling the amount of intake air of an internal combustion engine by varying valve lift characteristics of an intake valve;
   a collector having a plurality of opening portions and being fluidly connected at the opening portions with a plurality of intake passages for cylinders of the internal combustion engine, respectively; and
   a pressure control mechanism for producing within the collector a vacuum that increases continuously with increase of one of the amount of intake air, engine speed and engine load of the internal combustion engine, and
   wherein the pressure control mechanism comprises a pressure control valve whose opening degree is controlled by the vacuum within the collector.

2. An intake system according to claim 1, wherein the pressure control mechanism causes the vacuum to become smallest when an engine operating condition is idling.

3. An intake system according to claim 1, wherein the pressure control mechanism causes a pressure inside the collector to be an atmospheric pressure under a full load engine operating condition.

4. An intake system according to claim 1, wherein the pressure control mechanism increases the vacuum stepwise with increase of one of the amount of intake air and the engine load.

5. An intake system according to claim 1, further comprising a blow-by gas treatment passage, wherein an outlet of the blow-by gas treatment passage is fluidly connected to the collector.

6. An intake system according to claim 1, further comprising a blow-by gas treatment passage, wherein an outlet of the blow-by gas treatment passage is fluidly connected to the intake passages.

7. An intake system according to claim 1, further comprising an evaporated fuel treatment passage, wherein an outlet of the evaporated fuel treatment passage is fluidly connected to the collector.

8. An intake system according to claim 1, further comprising an evaporated fuel treatment passage, wherein an outlet of the evaporated fuel treatment passage is fluidly connected to the intake air passages.

9. An internal combustion engine comprising:
   a variable valve control apparatus for variably controlling a valve lift, operation angle and maximum lift phase of an intake valve thereby variably controlling the amount of intake air supplied to cylinders in accordance with an engine operating condition;
   a collector in the form of a box and having a plurality of opening portions;
   a plurality of intake passages fluidly connecting the opening portions of the collector to the cylinders; and
   a pressure control mechanism for producing within the collector a vacuum that varies depending upon a variation of the engine operating condition;
   wherein the pressure control mechanism increases the vacuum continuously with increase of one of the amount of intake air, engine speed and engine load; and
   wherein the pressure control mechanism comprises a pressure control valve whose opening degree is controlled by the vacuum within the collector.

10. An internal combustion engine according to claim 9, wherein the pressure control mechanism causes the vacuum to become smallest at idling.

11. An internal combustion engine according to claim 9, wherein the pressure control mechanism causes a pressure inside the collector to be an atmospheric pressure under a full load engine operating condition.

12. An internal combustion engine according to claim 9, wherein the pressure control mechanism increases the vacuum stepwise with increase of one of the amount of intake air and engine load.

13. An internal combustion engine according to claim 9, further comprising a blow-by gas treatment passage, wherein an outlet of the blow-by gas treatment passage is fluidly connected to the collector.

14. An internal combustion engine according to claim 9, further comprising a blow-by gas treatment passage, wherein an outlet of the blow-by gas treatment passage is fluidly connected to the intake passages.

15. An internal combustion engine according to claim 9, further comprising an evaporated fuel treatment passage, wherein an outlet of the evaporated fuel treatment passage is fluidly connected to the collector.

16. An internal combustion engine according to claim 9, further comprising an evaporated fuel treatment passage, wherein an outlet of the evaporated fuel treatment passage is fluidly connected to the intake air passages.

* * * * *